United States Patent
Li et al.

(10) Patent No.: US 9,699,686 B1
(45) Date of Patent: Jul. 4, 2017

(54) METHOD AND NETWORK ENTITY FOR GENERATING RESOURCE TEMPLATES FOR RADIO LINKS

(71) Applicant: Telefonaktiebolaget L M Ericsson (publ), Stockholm (SE)

(72) Inventors: Gen Li, Beijing (CN); Jinhua Liu, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/888,935

(22) PCT Filed: Oct. 27, 2015

(86) PCT No.: PCT/CN2015/092924
§ 371 (c)(1),
(2) Date: Nov. 3, 2015

(87) PCT Pub. No.: WO2017/070834
PCT Pub. Date: May 4, 2017

(51) Int. Cl.
*H04B 1/00* (2006.01)
*H04W 28/04* (2009.01)
*H04W 28/02* (2009.01)
*H04B 1/10* (2006.01)

(52) U.S. Cl.
CPC ..... *H04W 28/048* (2013.01); *H04W 28/0236* (2013.01); *H04W 28/0278* (2013.01)

(58) Field of Classification Search
CPC ......... H04W 28/1236; H04W 28/0278; H04W 28/048
USPC ........................................................ 455/63.1
See application file for complete search history.

(56) References Cited

FOREIGN PATENT DOCUMENTS

| CN | 102905378 A | * | 1/2013 | ........ H04W 28/0236 |
|---|---|---|---|---|
| CN | 103826311 A | | 5/2014 | |
| CN | 103987119 A | | 8/2014 | |
| WO | 2015109441 A1 | | 7/2015 | |

OTHER PUBLICATIONS

International Search Report and Written Opinion for Application No. PCT/CN2015/092924, mailed Jul. 21, 2016, 11 pages.

* cited by examiner

*Primary Examiner* — Lee Nguyen
(74) *Attorney, Agent, or Firm* — NDWE LLP (57) ABSTRACT

A method in a network entity for generating resource templates for a plurality of radio links. The method provides for obtaining link interference information representing interference relation among the plurality of radio links; dividing the plurality of radio links into a number of groups based on the link interference information, such that each radio link in each group does not interfere with any radio link in any other group; and generating resource templates for the plurality of radio links by determining, for each group individually, schedulabilities of resource elements for each radio link in the group.

26 Claims, 6 Drawing Sheets

| RE | #1 | #2 | #3 | #4 | #5 | #6 |
|---|---|---|---|---|---|---|
| Link 1 | P | P | P | P | P | P |

(a)

| | #1 | #2 | #3 | #4 | #5 | #6 |
|---|---|---|---|---|---|---|
| Link 10 | P | P | P | P | N | N |
| Link 4 | S | S | S | S | P | P |

(b)

| | #1 | #2 | #3 | #4 | #5 | #6 |
|---|---|---|---|---|---|---|
| Link 6 | P | P | C | C | N | N |
| Link 9 | S | S | S | S | P | P |

| RE      | #1 | #2 | #3 | #4 | #5 | #6 |
|---------|----|----|----|----|----|----|
| Link 5B | S  | S  | S  | S  | P  | P  |
| Link 7B | S  | S  | S  | S  | P  | P  |
| Link 3A | P  | P  | C  | C  | N  | N  |
| Link 8  | P  | P  | C  | C  | N  | N  |

(a) - SG2

| RE      | #1 | #2 | #3 | #4 | #5 | #6 |
|---------|----|----|----|----|----|----|
| Link 5A | P  | P  | N  | N  | P  | P  |
| Link 2  | S  | S  | P  | P  | S  | S  |

(b) - SG1

| RE      | #1 | #2 | #3 | #4 | #5 | #6 |
|---------|----|----|----|----|----|----|
| Link 7A | N  | N  | C  | C  | P  | P  |
| Link 3B | P  | P  | S  | S  | S  | S  |

| RE      | #1 | #2 | #3 | #4 | #5 | #6 |
|---------|----|----|----|----|----|----|
| Link 2  | S  | S  | P  | P  | S  | S  |
| Link 3  | P  | P  | S  | S  | N  | N  |
| Link 5  | S  | S  | N  | N  | P  | P  |
| Link 7  | N  | N  | C  | C  | P  | P  |
| Link 8  | P  | P  | C  | C  | N  | N  |

Fig. 11

METHOD AND NETWORK ENTITY FOR GENERATING RESOURCE TEMPLATES FOR RADIO LINKS

CROSS-REFERENCE TO RELATED APPLICATIONS

This application is a National stage of International Application No. PCT/CN2015/092924, filed Oct. 27, 2015, which is hereby incorporated by reference.

TECHNICAL FIELD

The present disclosure relates to radio communications, and more particularly, to a method and a network entity for generating resource templates for a plurality of radio links.

BACKGROUND

The next generation radio communication systems are expected to operate at much higher frequency when compared to the 3$^{rd}$ Generation (3G) and 4$^{th}$ Generation (4G) systems. Since a path loss of a radio signal is proportional to the square of its carrier frequency approximately, the signal attenuation at high frequency is much higher than at low frequency. As an example, the signal attenuation at 10 GHz could be 20 dB higher than that at 1 GHz.

In order to compensate for the increased attenuation at higher carrier frequency, the beam-forming technique is considered as one key component in the next generation systems. When many antenna elements of small antenna element size are integrated in a small antenna panel, it is possible to provide a much higher beam-forming gain than the 4G systems.

With such high beam-forming gain, inter-link interferences will become highly directional and thus the interference characteristics will become quite different from those in the 3G and 4G systems.

Figure 1:
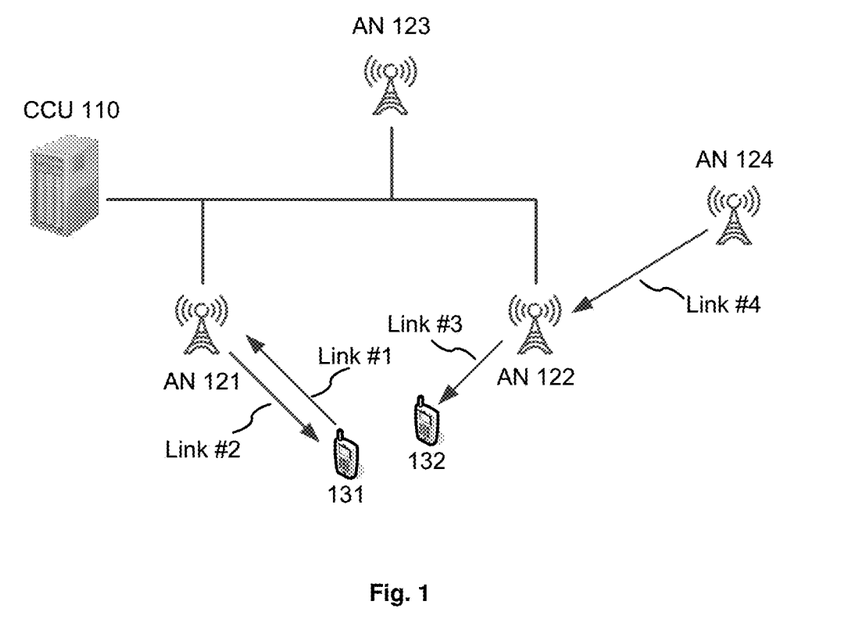
FIG. 1 is a schematic diagram showing an exemplary network scenario where the present disclosure can be applied.

FIG. 1 shows an exemplary network scenario. As shown in FIG. 1, a Central Control Unit (CCU) 110 controls a cluster of Access Nodes (ANs) 121, 122, 123 and 124. Each of the ANs may serve one or more terminal devices, two of which are shown at 131 and 132. FIG. 1 also shows several, but maybe not all, radio links in this cluster: Link #1 from the terminal device 131 to the AN 121, Link #2 from the AN 121 to the terminal device 131, Link #3 from the AN 122 to the terminal device 132 and Link #4 (a backhaul link) from the AN 124 to the AN 122. For each of these links, the CCU 110 allocates radio resources for the link and generates a resource template indicating the resource allocation.

Figure 2:
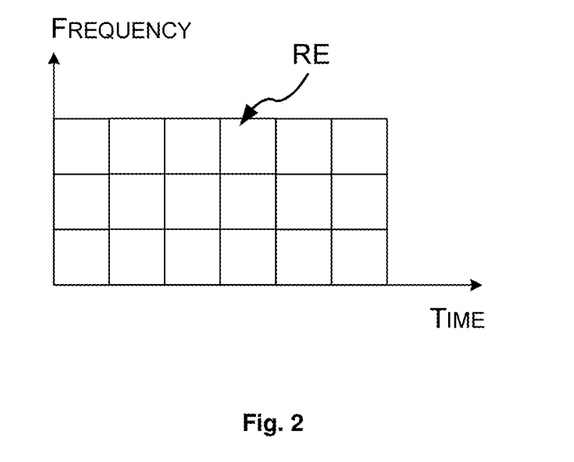
FIG. 2 is a schematic diagram showing an example of a resource template for a radio link.

FIG. 2 shows an example of a resource template for a radio link, e.g., Link #1. The smallest grid in time (sub-frame) and frequency (subcarrier) is referred to as a Resource Element (RE). These REs may be assigned with different schedulabilities (or scheduling priorities), such that the AN 121 may determine which of these REs is/are to be scheduled for Link #1 based on the schedulabilities.

One solution is to design resource templates with schedulabilities that can mitigate the inter-link interferences in the cluster.

SUMMARY

One feature of the present disclosure is to provide a method and a network entity for generating resource templates for a plurality of radio links, capable of mitigating inter-link interferences.

In a first aspect, a method in a network entity for generating resource templates for a plurality of radio links is provided. The method comprises: obtaining link interference information representing interference relation among the plurality of radio links; dividing the plurality of radio links into a number of groups based on the link interference information, such that each radio link in each group does not interfere with any radio link in any other group; and generating resource templates for the plurality of radio links by determining, for each group individually, schedulabilities of resource elements for each radio link in the group, such that in the group: any resource element prioritized to be schedulable for an interfered radio link is not schedulable for any interfering radio link that interferes with that interfered radio link, and any resource element schedulable for an interfering radio link is, but not prioritized to be, schedulable for each interfered radio link that is interfered by that interfering radio link.

In an embodiment, in the step of generating, each radio link that is both interfering and interfered is treated as two separate radio links: an interfering link and an interfered link.

In an embodiment, the step of generating comprises, for each group containing at least one radio link that is both interfering and interfered: subdividing the group into two or more sub-groups such that each radio link in each subgroup does not interfere with any radio link in any other subgroup; and determining, for each subgroup individually, schedulabilities of resource elements for each radio link in the subgroup, such that in the subgroup: any resource element prioritized to be schedulable for each interfered radio link is not schedulable for any interfering radio link, and any resource element schedulable for any interfering radio link is, but not prioritized to be, schedulable for each interfered radio link.

In an embodiment, the step of generating further comprises, for a first radio link that is treated as a first interfering link and a first interfered link: combining the schedulabilities of the resource elements for the first interfering link and the first interfered link such that: any resource element not schedulable for at least one of the first interfering link and the first interfered link is not schedulable for the first radio link; any resource element prioritized to be schedulable for both the first interfering link and the first interfered link is prioritized to be schedulable for the first radio link; and any remaining resource element is, but not prioritized to be, schedulable for the first radio link.

In an embodiment, each of the plurality of radio links is assigned with a template generation priority and each subgroup has a subgroup priority dependent on the highest template generation priority among the radio links in the subgroup, and wherein the schedulabilities are determined for the two or more subgroups in a descending order of the subgroup priorities.

In an embodiment, the template generation priority is assigned to each radio link randomly or based on at least one of: a traffic type, a buffer status and a scheduling fairness factor associated with the radio link.

In an embodiment, for a radio link that is treated as an interfering link and an interfered link, the interfered link has a higher template generation priority than the interfering link.

In an embodiment, the step of generating comprises: for a first radio link that is treated as a first interfering link and a first interfered link, aligning at least one of the resource elements schedulable for the first interfering link and at least one of the resource elements schedulable for the first interfered link.

In an embodiment, a resource element schedulable for an interfering radio link comprises: a resource element prioritized to be schedulable for the interfering radio link; or a resource element prioritized to be schedulable for the interfering radio link with a constraint to reduce transmission power in the resource element or blank transmission in the resource element in a timer-based pattern.

In an embodiment, the network entity is a Central Control Unit (CCU) controlling a cluster of Access Nodes (ANs) and the plurality of radio links comprise links between the ANs and their associated terminal devices, and/or links between the ANs.

In a second aspect, a network entity for generating resource templates for a plurality of radio links is provided. The network entity comprises: an obtaining unit configured to obtain link interference information representing interference relation among the plurality of radio links; a dividing unit configured to divide the plurality of radio links into a number of groups based on the link interference information, such that each radio link in each group does not interfere with any radio link in any other group; and a generating unit configured to generate resource templates for the plurality of radio links by determining, for each group individually, schedulabilities of resource elements for each radio link in the group, such that in the group: any resource element prioritized to be schedulable for an interfered radio link is not schedulable for any interfering radio link that interferes with that interfered radio link, and any resource element schedulable for an interfering radio link is, but not prioritized to be, schedulable for each interfered radio link that is interfered by that interfering radio link.

The above embodiments of the first aspect are also applicable for the second aspect.

With the embodiments of the present disclosure, link interference information representing interference relation among a plurality of radio links is obtained. The plurality of radio links are divided into a number of groups based on the link interference information, such that each radio link in each group does not interfere with any radio link in any other group. Then, resource templates are generated for the plurality of radio links by determining, for each group individually, schedulabilities of resource elements for each radio link in the group, such that in the group: any resource element prioritized to be schedulable for an interfered radio link is not schedulable for any interfering radio link that interferes with that interfered radio link, and any resource element schedulable for an interfering radio link is, but not prioritized to be, schedulable for each interfered radio link that is interfered by that interfering radio link. In this way, it is possible to mitigate inter-link interferences.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 3:
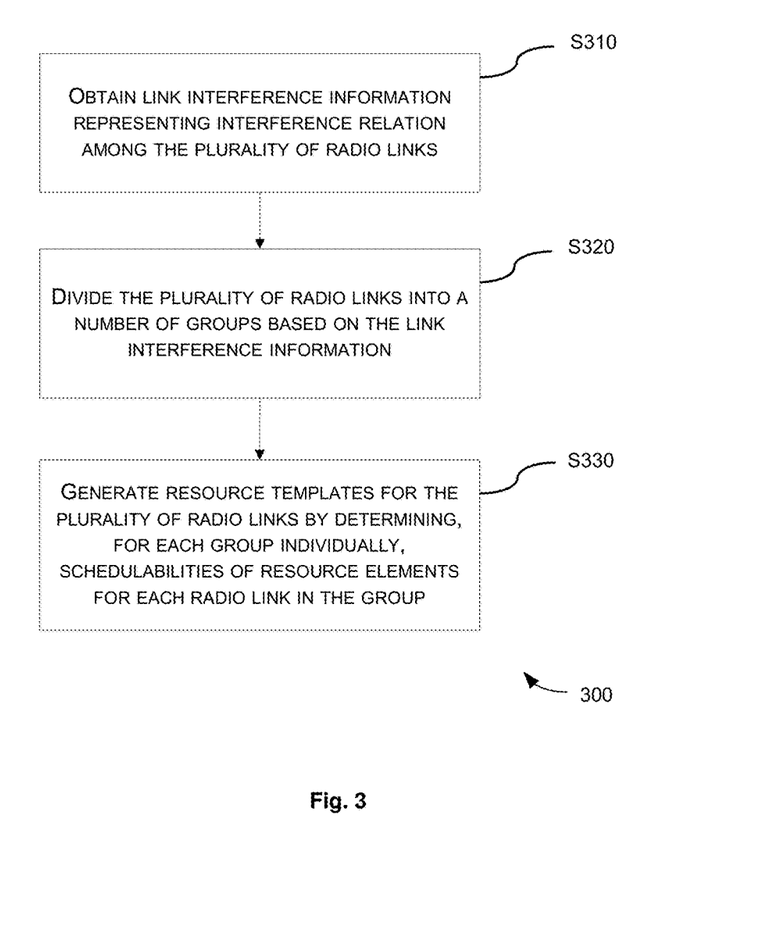
FIG. 3 is a flowchart illustrating a method for generating resource templates for a plurality of radio links according to an embodiment of the present disclosure.

FIG. 3 is a flowchart illustrating a method 300 for generating resource templates for a plurality of radio links according to an embodiment of the present disclosure. The method 300 can be performed at a network entity (e.g., the CCU 110 in FIG. 1). The plurality of radio links can be links between ANs and their associated terminal devices, and/or links between the ANs. The term "link" as used herein refers to unidirectional link, i.e., from an AN to a terminal device, from a terminal device to an AN, or from an AN to another AN. The method 300 includes the following steps.

At step S310, link interference information representing interference relation among the plurality of radio links is obtained.

For example, in the scenario shown in FIG. 1, transmitters (ANs or terminal devices) in a cluster may transmit radio signals on their respective transmission links in a time and/or frequency division manner. Each receiver (AN or terminal device) can detect these radio signals on its reception link to obtain an interference measurement indicating any interference on its reception link from one or more other links in the cluster. Then, the ANs and terminal devices in the cluster can report their respective interference measurements to the CCU 110. In this way, the CCU 110 can obtain the interference relation among all the links in its cluster.

At step S320, the plurality of radio links are divided into a number of groups based on the link interference information, such that each radio link in each group does not interfere with any radio link in any other group.

Figure 4:
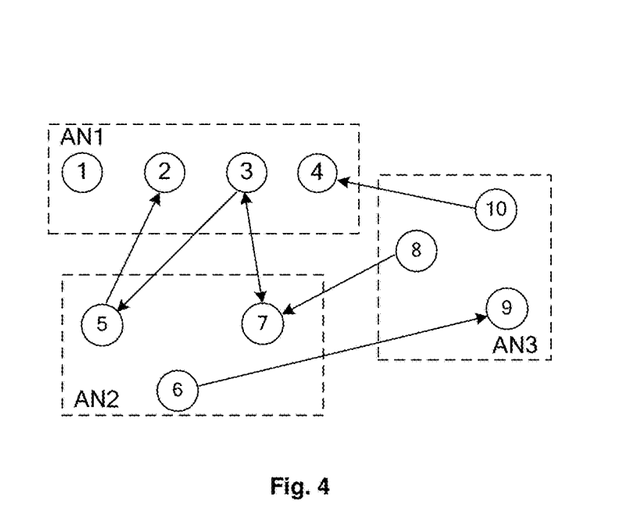
FIG. 4 is a schematic diagram showing an exemplary link interference relation.

This will be explained in detail below with reference to an exemplary link interference relation shown in FIG. 4. In this example, it is assumed that there are three ANs in a cluster: AN1, AN2 and AN3. Each circle in FIG. 4 represents a link and a directional line with an arrow represents interference. As shown in FIG. 4, the AN1 is involved in four links, Links 1~4, the AN2 three links, Links 5~7, and the AN3 three links, Links 8~10. Link 1 is neither interfering nor interfered. Link 3 interferes with Links 5 and 7. Link 5 interferes with Link 2. Link 6 interferes with Link 9. Link 7 interferes with Link 3. Link 8 interferes with Link 7. Link 10 interferes with Link 4.

Figure 5:
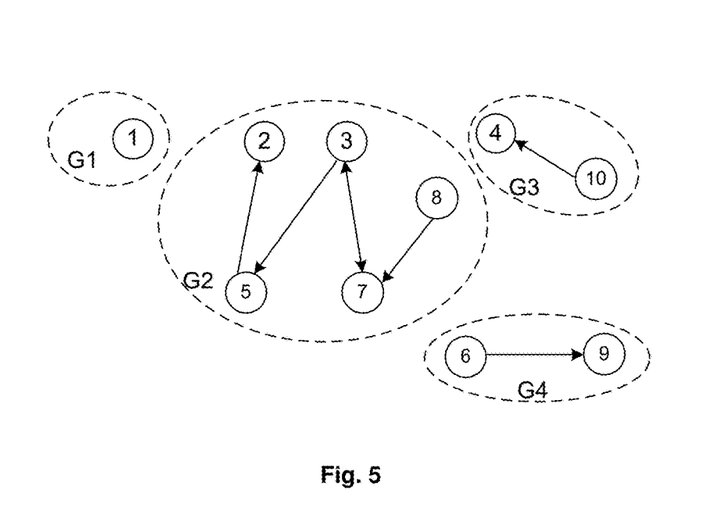
FIG. 5 is a schematic diagram showing groups divided based on the link interference relation of FIG. 4.

In this example, Links 1~10 can be divided into four groups, G1~G4, based on the link interference relation, as shown in FIG. 5. In FIG. 5, each of the groups G1~G4 is surrounded by a dashed ellipse. That is, the group G1 includes only one link, Link 1; the group G2 includes Links 2, 3, 5, 7 and 8; the group G3 includes Links 4 and 10; and the group G4 includes Links 6 and 9. It can be seen that each radio link in each group does not interfere with any radio link in any other group.

At step S330, resource templates are generated for the plurality of radio links by determining, for each group individually, schedulabilities of REs for each radio link in the group, such that in the group: any RE prioritized to be schedulable for an interfered radio link is not schedulable for any interfering radio link that interferes with that interfered radio link, and any RE schedulable for an interfering radio link is, but not prioritized to be, schedulable for each interfered radio link that is interfered by that interfering radio link.

The "schedulability" of an RE for a radio link, as used herein, refers to a scheduling priority for the RE to be schedulable for the radio link. Examples of schedulabilities include, but not limited to:

Prioritized (P): the RE is prioritized to be schedulable by the radio link;
Schedulable but not prioritized (S): the RE is, but not prioritized to be, schedulable for the radio link; and
Not schedulable (N): the RE is not schedulable for the radio link.

Figure 6:
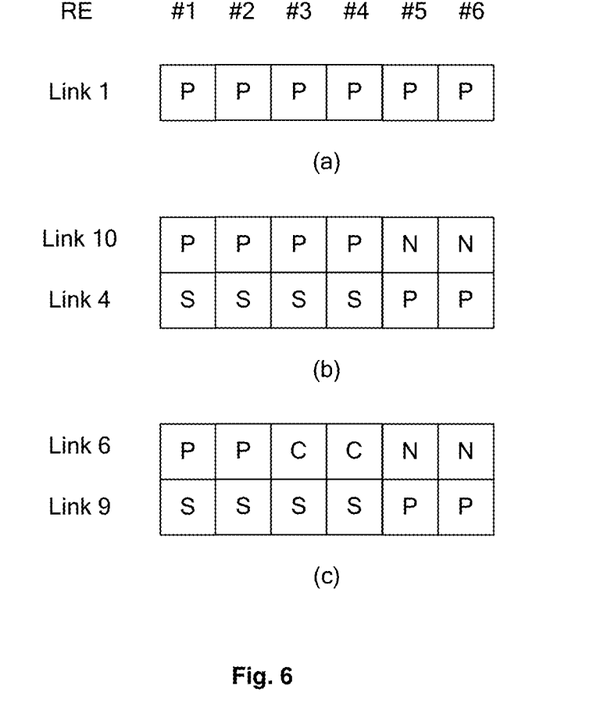
FIG. 6 is a schematic diagram showing an example of resource template.

In the step S330, the resource templates are generated for each group independently from any other group(s). In particular, in the above example shown in FIGS. 4 and 5, the group G1 is includes only one link (Link 1), i.e., there is neither interfering link nor interfered link in this group, and the schedulabilities of all the REs for Link 1 can be determined as "P", as shown in FIG. 6(*a*). The group G3 includes two links, Link 4 and Link 10, where Link 10 interferes with Link 4, i.e., Link 10 is the interfering link and Link 4 is the interfered link. Thus, for the group G3, the REs prioritized to be schedulable for the interfered Link 4 (labeled as "P"), i.e., REs #5 and #6, are not schedulable for the interfering Link 10 (labeled as "N"); and the REs schedulable (prioritized in this case) for the interfering Link 10 (labeled as "P"), i.e., REs #1~#4, are, but not prioritized to be, schedulable for the interfered Link 4 (labeled as "S"), as shown in FIG. 6(*b*).

In an example, the "schedulability" of an RE for a radio link further includes:

Prioritized with constraint (C): the RE is prioritized to be schedulable for the radio link with a constraint to reduce transmission power in the RE or blank transmission in the RE in a timer-based pattern (e.g., periodically).

The group G4 includes two links, Link 6 and Link 9, where Link 6 interferes with Link 9, i.e., Link 6 is the interfering link and Link 9 is the interfered link. For the group G4, the REs prioritized to be schedulable for the interfered Link 9 (labeled as "P"), i.e., REs #5 and #6, are not schedulable for the interfering Link 6 (labeled as "N"); and the REs schedulable (including prioritized and prioritized with constraint in this case) for the interfering Link 6 (labeled as "P" or "C"), i.e., REs #1~#4, are, but not prioritized to be, schedulable for the interfered Link 9 (labeled as "S"), as shown in FIG. 6(*c*).

Here, an RE having the above schedulability P, C or S for a radio link can be referred to as "schedulable" for the radio link.

In the example shown in FIG. 6, it is assumed that each resource template contains only one subcarrier (and thus the frequency dimension is not shown) and six subframes. However, it can be appreciated by those skilled in the art that a resource template often contain more than one subcarrier and more or less subframes.

As one may notice, for the group G2, each radio link that is both interfering and interfered is treated as two separate radio links: an interfering link and an interfered link. This scenario may happen sometimes. Accordingly, for the group G2, each of Links 2, 3, 5, 7 and 8 should satisfy the above criteria that "any RE prioritized to be schedulable for an interfered radio link is not schedulable for any interfering radio link that interferes with that interfered radio link and any RE schedulable for an interfering radio link is, but not prioritized to be, schedulable for each interfered radio link that is interfered by that interfering radio link", as either an interfering link or an interfered link.

Figure 7:
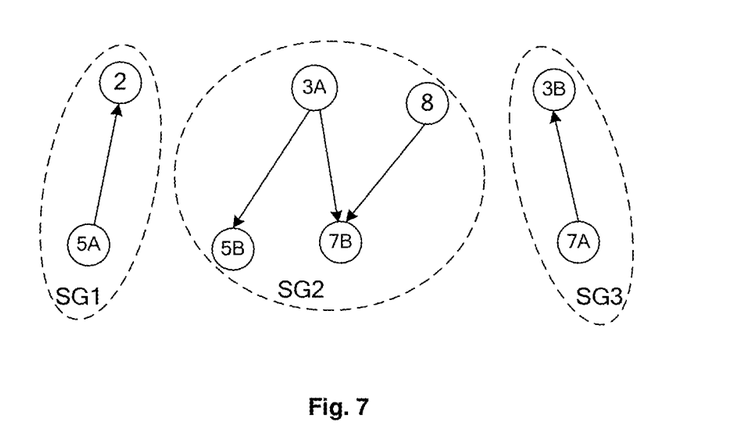
FIG. 7 is a schematic diagram showing an example of subgroups.

In an exemplary embodiment, in order to determine the schedulabilities of REs for each of Links 2, 3, 5, 7 and 8 in the group G2, the group G2 can be subdivided into two or more sub-groups such that each radio link in each subgroup does not interfere with any radio link in any other subgroup. Here, Link 3 is treated as an interfering link, Link 3A, and an interfered link, Link 3B. Similarly, Link 5 is treated as an interfering link, Link 5A, and an interfered link, Link 5B; and Link 7 is treated as an interfering link, Link 7A, and an interfered link, Link 7B. In this way, the group G2 shown in FIG. 5 can be divided into three subgroups: a subgroup SG1 including Link 2 and Link 5A; a subgroup SG2 including Links 3A, 5B, 7B and 8; and a subgroup SG3 including Link 3B and Link 7A, as shown in FIG. 7.

Then, for each subgroup individually, schedulabilities of REs for each radio link in the subgroup can be determined, such that in the subgroup: any RE prioritized to be schedulable for each interfered radio link is not schedulable for any interfering radio link, and any RE schedulable for any interfering radio link is, but not prioritized to be, schedulable for each interfered radio link.

In an example, each of the radio links is assigned with a template generation priority. The template generation priority can be assigned randomly. Alternatively, the template generation priority can be assigned to each radio link based on at least one of: a traffic type, a buffer status and a scheduling fairness factor associated with the radio link. As an example, a radio link associated with a delay-sensitive traffic may have a higher template generation priority than a radio link associated with a less delay-sensitive traffic. As another example, a radio link having a larger amount of buffered data may have a higher template generation priority than a radio link having a smaller amount of buffered data. As yet another example, for the purpose of scheduling fairness, a radio link for which a smaller number of prioritized REs have been scheduled in a time period may have a higher template generation priority than a radio link for which a higher number of prioritized REs have been scheduled in the time period. Further, for a radio link that is treated as an interfering link and an interfered link, the interfered link may have a higher template generation priority than the interfering link.

Then, each subgroup has a subgroup priority dependent on the highest template generation priority among the radio links in the subgroup.

In particular, for the group G2 in the above example, it is assumed here that the template generation priorities of Links 2, 3, 5, 7 and 8 are TP2, TP3, TP5, TP7 and TP8, respectively, and satisfy: TP5>TP2>TP7>TP3>TP8. Accordingly, the template generation priorities of Links 2, 3A, 3B, 5A, 5B, 7A, 7B and 8 satisfy: TP5B>TP5A>TP2>TP7B>TP7A>TP3B>TP3A>TP8. In this case, among the subgroups SG1, SG2 and SG3, the subgroup SG2 has the highest subgroup priority (dependent on TP5B), the subgroup SG1 has the second highest subgroup priority (dependent on TP5A) and the SG3 has the lowest subgroup priority (dependent on TP7A).

Figure 8:
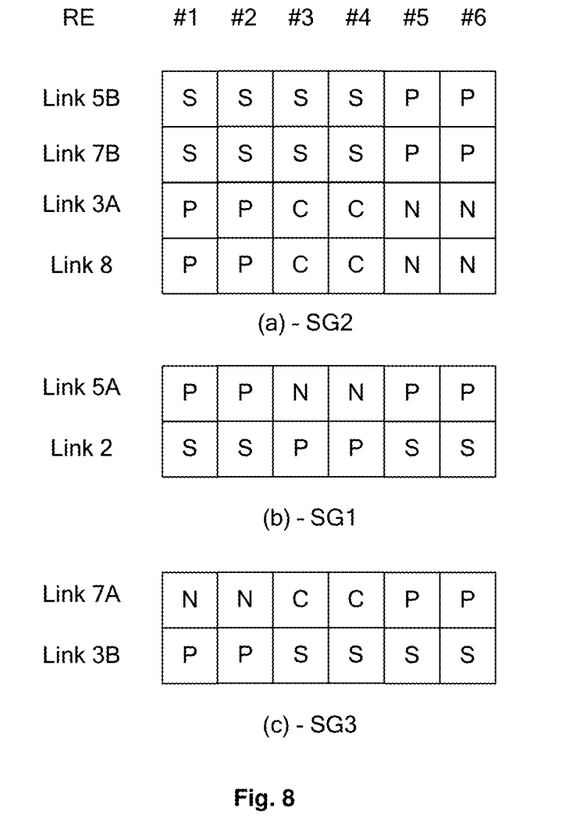
FIG. 8 is a schematic diagram showing an example of RE schedulabilities for subgroups.

FIG. 8 shows an example of resource templates generated for the subgroups SG1, SG2 and SG3. Referring to FIG. 8(a), the schedulabilities of REs are determined for the links in the subgroup SG2 having the highest subgroup priority first. The subgroup SG2 includes two interfering links, Link 3A and Link 8, and two interfered links, Link 5B and Link 7B. In this example, the REs prioritized to be schedulable for the interfered Links 5B and 7B (labeled as "P"), i.e., REs #5 and #6, are not schedulable for the interfering Links 3A and 8 (labeled as "N"). The REs schedulable (including prioritized and prioritized with constraint in this case) for the interfering Links 3A and 8 (labeled as "P" or "C"), i.e., REs #1~#4, are, but not prioritized to be, schedulable for the interfered Links 5B and 7B (labeled as "S"). Then, the schedulabilities of REs are determined for the links in the subgroup SG1 having the second highest subgroup priority. Referring to FIG. 8(b), in this example, the REs prioritized to be schedulable for the interfered Link 2 (labeled as "P"), i.e., REs #3 and #4, are not schedulable for the interfering Link 5A (labeled as "N"). The REs prioritized to be schedulable for the interfering Link 5A (labeled as "P"), i.e., REs #1, #2, #5 and #6, are, but not prioritized to be, schedulable for the interfered Link 2 (labeled as "S"). Finally, the schedulabilities of REs are determined for the links in the subgroup SG3 having the lowest subgroup priority. Referring to FIG. 8(c), in this example, the REs prioritized to be schedulable for the interfered Link 3B (labeled as "P"), i.e., REs #1 and #2, are not schedulable for the interfering Link 7A (labeled as "N"). The REs schedulable (including prioritized and prioritized with constraint in this case) for the interfering Link 7A (labeled as "P" or "C"), i.e., REs #3~#6, are, but not prioritized to be, schedulable for the interfered Link 3B (labeled as "S").

Then, for each radio link that is treated as an interfering link and an interfered link, the schedulabilities of the REs for the interfering link and the interfered link can be combined, such that: any RE not schedulable for at least one of the interfering link and the interfered link is not schedulable for the radio link; any RE prioritized to be schedulable for both the interfering link and the interfered link is prioritized to be schedulable for the radio link; and any remaining RE is, but not prioritized to be, schedulable for the radio link. In other words, two scheduling priorities are combined into the lower one (here the descending order of the scheduling priorities is P>C>S>N).

Figure 9:
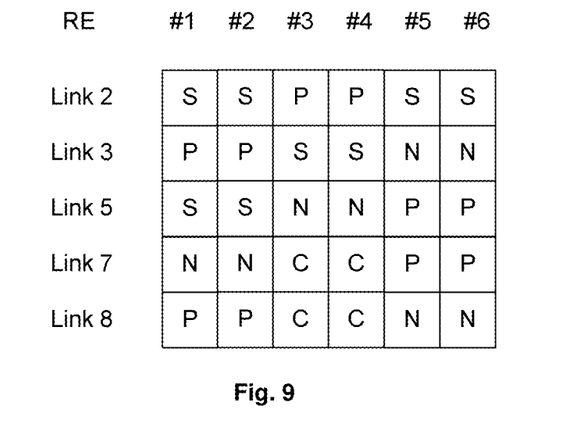
FIG. 9 is a schematic diagram showing an example of combination of the RE schedulabilities shown in FIG. 8.

In particular, referring to FIG. 9, for the group G2 in the above example, the resource templates for Links 2 and 8 can be obtained directly from FIG. 8. For Link 3, REs #1 and #2 are prioritized to be schedulable for both Link 3A and Link 3B and thus are prioritized to be schedulable for Link 3 (labeled as "P"); REs #3 and #4 are prioritized (with constraint) to be schedulable for Link 3A and are, but not prioritized to be, schedulable for Link 3B and thus are, but not prioritized to be, schedulable for Link 3 (labeled as "S"); and REs #5 and #6 are not schedulable for Link 3A and thus are not schedulable for Link 3 (labeled as "N"). Similarly, for Link 5, REs #1 and #2 are prioritized to be schedulable for Link 5A and are, but not prioritized to be, schedulable for Link 5B and thus are, but not prioritized to be, schedulable for Link 5 (labeled as "S"); REs #3 and #4 are not schedulable for Link 5A and thus are not schedulable for Link 5 (labeled as "N"); and REs #5 and #6 are prioritized to be schedulable for both Link 5A and Link 5B and thus are prioritized to be schedulable for Link 5 (labeled as "P"). Similarly, for Link 7, REs #1 and #2 are not schedulable for Link 7A and thus are not schedulable for Link 7 (labeled as "N"); REs #3 and #4 are prioritized (with constraint) to be schedulable for Link 7A and are, but not prioritized to be, schedulable for Link 7B and thus are, but not prioritized to be, schedulable for Link 7 (labeled as "S"); and REs #5 and #6 are prioritized to be schedulable for both Link 7A and Link 7B and thus are prioritized to be schedulable for Link 7 (labeled as "P").

Preferably, for a radio link that is treated as both an interfering link and an interfered link, at least one of the REs schedulable for the interfering link and at least one of the REs schedulable for the interfered link can be aligned in time, such that, after the combination, the radio link can have at least one schedulable RE. For example, as show in FIGS. 8 and 9, the prioritized REs for Links 3A and 3B (i.e., REs #1 and #2) are aligned in time, such that, after the combination, these REs are prioritized to be schedulable for Link 3.

Figure 10:
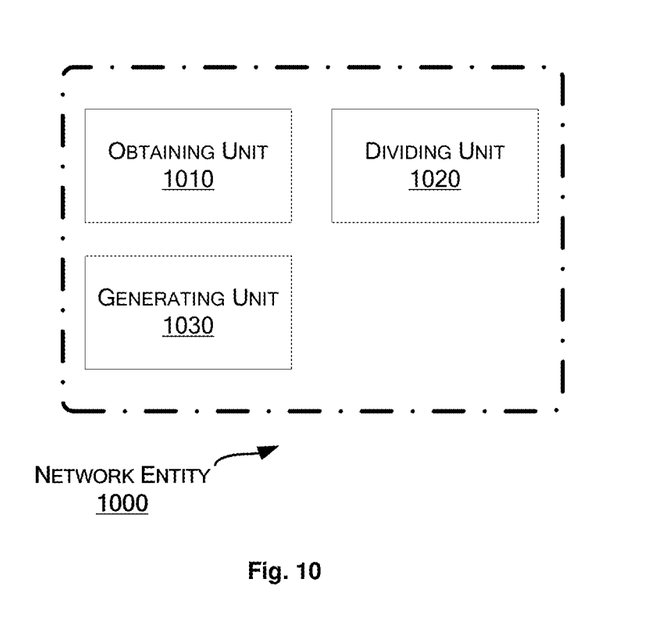
FIG. 10 is a block diagram of a network entity according to an embodiment of the present disclosure.

Correspondingly to the method 300 as described above, a network entity is provided. FIG. 10 is a block diagram of a network entity 1000 for generating resource templates for a plurality of radio links according to an embodiment of the present disclosure. The network entity can be a CCU (e.g., the CCU 110 in FIG. 1) controlling a cluster of ANs and the plurality of radio links comprise links between the ANs and their associated terminal devices, and/or links between the ANs. It is to be noted here that, in an example, an AN (e.g., a centralized AN) may have the CCU functions and act as a CCU.

As shown in FIG. 10, the network entity 1000 includes an obtaining unit 1010 configured to obtain link interference information representing interference relation among the plurality of radio links. The network entity 1000 further includes a dividing unit 1020 configured to divide the plurality of radio links into a number of groups based on the link interference information, such that each radio link in each group does not interfere with any radio link in any other group. The network entity 1000 further includes a generating unit 1030 configured to generate resource templates for the plurality of radio links by determining, for each group individually, schedulabilities of resource elements for each radio link in the group, such that in the group: any resource element prioritized to be schedulable for an interfered radio link is not schedulable for any interfering radio link that interferes with that interfered radio link, and any resource element schedulable for an interfering radio link is, but not prioritized to be, schedulable for each interfered radio link that is interfered by that interfering radio link.

In an embodiment, the generating unit 1030 is configured to treat each radio link that is both interfering and interfered as two separate radio links: an interfering link and an interfered link.

In an embodiment, the generating unit 1030 is configured to, for each group containing at least one radio link that is both interfering and interfered: subdivide the group into two or more sub-groups such that each radio link in each subgroup does not interfere with any radio link in any other subgroup; and determine, for each subgroup individually, schedulabilities of resource elements for each radio link in the subgroup, such that in the subgroup: any resource element prioritized to be schedulable for each interfered radio link is not schedulable for any interfering radio link, and any resource element schedulable for any interfering radio link is, but not prioritized to be, schedulable for each interfered radio link.

In an embodiment, the generating unit 1030 is further configured to, for a first radio link that is treated as a first interfering link and a first interfered link: combine the schedulabilities of the resource elements for the first interfering link and the first interfered link such that: any resource element not schedulable for at least one of the first interfering link and the first interfered link is not schedulable for the first radio link; any resource element prioritized to be schedulable for both the first interfering link and the first interfered link is prioritized to be schedulable for the first radio link; and any remaining resource element is, but not prioritized to be, schedulable for the first radio link.

In an embodiment, each of the plurality of radio links is assigned with a template generation priority and each subgroup has a subgroup priority dependent on the highest template generation priority among the radio links in the subgroup. The generating unit 1030 is configured to determine the schedulabilities for the two or more subgroups in a descending order of the subgroup priorities.

In an embodiment, the template generation priority is assigned to each radio link randomly or based on at least one of: a traffic type, a buffer status and a scheduling fairness factor associated with the radio link.

In an embodiment, for a radio link that is treated as an interfering link and an interfered link, the interfered link has a higher template generation priority than the interfering link.

In an embodiment, the generating unit 1030 is configured to: for a first radio link that is treated as a first interfering link and a first interfered link, align at least one of the resource elements schedulable for the first interfering link and at least one of the resource elements schedulable for the first interfered link.

In an embodiment, a resource element schedulable for an interfering radio link comprises: a resource element prioritized to be schedulable for the interfering radio link; or a resource element prioritized to be schedulable for the interfering radio link with a constraint to reduce transmission power in the resource element or blank transmission in the resource element in a timer-based pattern.

Each of the units 1010-1030 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 11:
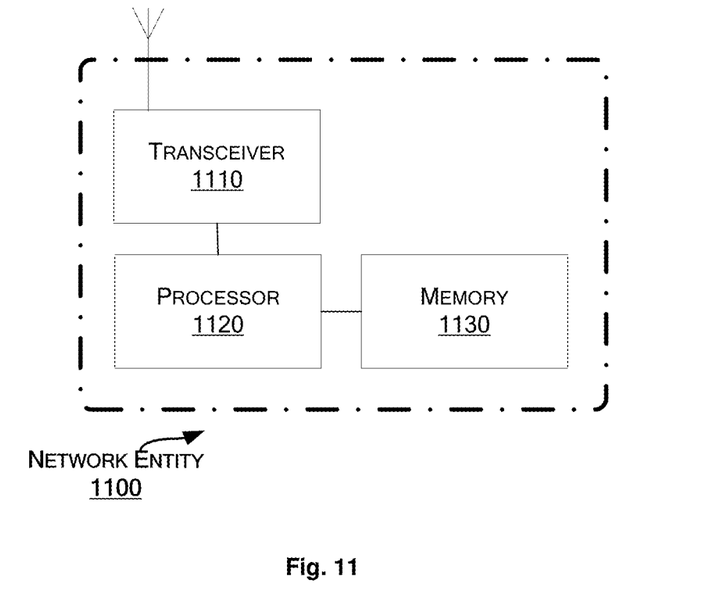
FIG. 11 is a block diagram of a network entity according to another embodiment of the present disclosure.

FIG. 11 is a block diagram of a network entity 1100 according to another embodiment of the present disclosure.

The network entity 1100 includes a transceiver 1110, a processor 1120 and a memory 1130. The memory 1130 contains instructions executable by the processor 1120 whereby the network entity 1100 is operative to generate resource templates for a plurality of radio links by: obtaining link interference information representing interference relation among the plurality of radio links; dividing the plurality of radio links into a number of groups based on the link interference information, such that each radio link in each group does not interfere with any radio link in any other group; and generating resource templates for the plurality of radio links by determining, for each group individually, schedulabilities of resource elements for each radio link in the group, such that in the group: any resource element prioritized to be schedulable for an interfered radio link is not schedulable for any interfering radio link that interferes with that interfered radio link, and any resource element schedulable for an interfering radio link is, but not prioritized to be, schedulable for each interfered radio link that is interfered by that interfering radio link.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 1120 causes the network entity 1100 to perform the actions, e.g., of the procedure described earlier in conjunction with FIG. 3.

The computer program product may be configured as a computer program code structured in computer program modules. The computer program modules could essentially perform the actions of the flow illustrated in FIG. 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network entity for generating resource templates for a plurality of radio links, comprising:
   obtaining link interference information representing interference relation among the plurality of radio links;
   dividing the plurality of radio links into a number of groups based on the link interference information, such that each radio link in each group does not interfere with any radio link in any other group; and
   generating resource templates for the plurality of radio links by determining, for each group individually, schedulabilities of resource elements for each radio link in the group, such that in the group:
      any resource element prioritized to be schedulable for an interfered radio link is not schedulable for any interfering radio link that interferes with that interfered radio link, and
      any resource element schedulable for an interfering radio link is, but not prioritized to be, schedulable for each interfered radio link that is interfered by that interfering radio link.

2. The method of claim 1, wherein, in said generating, each radio link that is both interfering and interfered is treated as two separate radio links, which are an interfering link and an interfered link.

3. The method of claim 2, wherein said generating comprises, for each group containing at least one radio link that is both interfering and interfered:
- subdividing the group into two or more subgroups, such that each radio link in each subgroup does not interfere with any radio link in any other subgroup; and
- determining, for each subgroup individually, schedulabilities of resource elements for each radio link in the subgroup, such that in the subgroup:
  - any resource element prioritized to be schedulable for each interfered radio link is not schedulable for any interfering radio link, and
  - any resource element schedulable for any interfering radio link is, but not prioritized to be, schedulable for each interfered radio link.

4. The method of claim 3, wherein said generating further comprises, for a first radio link that is treated as a first interfering link and a first interfered link: combining the schedulabilities of the resource elements for the first interfering link and the first interfered link such that:
- any resource element not schedulable for at least one of the first interfering link and the first interfered link is not schedulable for the first radio link;
- any resource element prioritized to be schedulable for both the first interfering link and the first interfered link is prioritized to be schedulable for the first radio link; and
- any remaining resource element is, but not prioritized to be, schedulable for the first radio link.

5. The method of claim 4, wherein each of the plurality of radio links is assigned with a template generation priority and each subgroup has a subgroup priority dependent on a highest template generation priority among the radio links in the subgroup, and wherein the schedulabilities are determined for two or more subgroups in a descending order of the subgroup priorities.

6. The method of claim 5, wherein, for a radio link that is treated as an interfering link and an interfered link, the interfered link has a higher template generation priority than the interfering link.

7. The method of claim 3, wherein each of the plurality of radio links is assigned a template generation priority and each subgroup has a subgroup priority dependent on a highest template generation priority among the radio links in the subgroup, and wherein the schedulabilities are determined for the two or more subgroups in a descending order of the subgroup priorities.

8. The method of claim 7, wherein the template generation priority is assigned to each radio link randomly or based on at least one of: a traffic type, a buffer status and a scheduling fairness factor associated with the radio link.

9. The method of claim 8, wherein, for a radio link that is treated as an interfering link and an interfered link, the interfered link has a higher template generation priority than the interfering link.

10. The method of claim 7, wherein, for a radio link that is treated as an interfering link and an interfered link, the interfered link has a higher template generation priority than the interfering link.

11. The method of claim 3, wherein said generating comprises: for a first radio link that is treated as a first interfering link and a first interfered link, aligning at least one of the resource elements schedulable for the first interfering link and at least one of the resource elements schedulable for the first interfered link.

12. The method of claim 1, wherein a resource element schedulable for an interfering radio link comprises: a resource element prioritized to be schedulable for the interfering radio link; or a resource element prioritized to be schedulable for the interfering radio link with a constraint to reduce transmission power in the resource element, or blank transmission in the resource element, in a timer-based pattern.

13. The method of claim 1, wherein the network entity is a Central Control Unit (CCU) controlling a cluster of Access Nodes (ANs) and the plurality of radio links comprise links between the ANs and their associated terminal devices, links between the ANs, or both types of links.

14. A network entity for generating resource templates for a plurality of radio links, comprising:
- an obtaining unit configured to obtain link interference information representing interference relation among the plurality of radio links;
- a dividing unit configured to divide the plurality of radio links into a number of groups based on the link interference information, such that each radio link in each group does not interfere with any radio link in any other group; and
- a generating unit configured to generate resource templates for the plurality of radio links by determining, for each group individually, schedulabilities of resource elements for each radio link in the group, such that in the group:
  - any resource element prioritized to be schedulable for an interfered radio link is not schedulable for any interfering radio link that interferes with that interfered radio link, and
  - any resource element schedulable for an interfering radio link is, but not prioritized to be, schedulable for each interfered radio link that is interfered by that interfering radio link.

15. The network entity of claim 14, wherein the generating unit is configured to treat each radio link that is both interfering and interfered as two separate radio links, which are an interfering link and an interfered link.

16. The network entity of claim 15, wherein the generating unit is configured to, for each group containing at least one radio link that is both interfering and interfered:
- subdivide the group into two or more subgroups, such that each radio link in each subgroup does not interfere with any radio link in any other subgroup; and
- determine, for each subgroup individually, schedulabilities of resource elements for each radio link in the subgroup, such that in the subgroup:
  - any resource element prioritized to be schedulable for each interfered radio link is not schedulable for any interfering radio link, and
  - any resource element schedulable for any interfering radio link is, but not prioritized to be, schedulable for each interfered radio link.

17. The network entity of claim 16, wherein the generating unit is further configured to, for a first radio link that is treated as a first interfering link and a first interfered link: combine the schedulabilities of the resource elements for the first interfering link and the first interfered link such that:
- any resource element not schedulable for at least one of the first interfering link and the first interfered link is not schedulable for the first radio link;

any resource element prioritized to be schedulable for both the first interfering link and the first interfered link is prioritized to be schedulable for the first radio link; and any remaining resource element is, but not prioritized to be, schedulable for the first radio link.

18. The network entity of claim 17, wherein each of the plurality of radio links is assigned with a template generation priority and each subgroup has a subgroup priority dependent on a highest template generation priority among the radio links in the subgroup, and wherein the generating unit is configured to determine the schedulabilities for two or more subgroups in a descending order of the subgroup priorities.

19. The network entity of claim 18, wherein, for a radio link that is treated as an interfering link and an interfered link, the interfered link has a higher template generation priority than the interfering link.

20. The network entity of claim 16, wherein each of the plurality of radio links is assigned a template generation priority and each subgroup has a subgroup priority dependent on a highest template generation priority among the radio links in the subgroup, and wherein the generating unit is configured to determine the schedulabilities for the two or more subgroups in a descending order of the subgroup priorities.

21. The network entity of claim 20, wherein the template generation priority is assigned to each radio link randomly or based on at least one of: a traffic type, a buffer status and a scheduling fairness factor associated with the radio link.

22. The network entity of claim 21, wherein, for a radio link that is treated as an interfering link and an interfered link, the interfered link has a higher template generation priority than the interfering link.

23. The network entity of claim 20, wherein, for a radio link that is treated as an interfering link and an interfered link, the interfered link has a higher template generation priority than the interfering link.

24. The network entity of claim 16, wherein the generating unit is configured to: for a first radio link that is treated as a first interfering link and a first interfered link, align at least one of the resource elements schedulable for the first interfering link and at least one of the resource elements schedulable for the first interfered link.

25. The network entity of claim 14, wherein a resource element schedulable for an interfering radio link comprises: a resource element prioritized to be schedulable for the interfering radio link; or a resource element prioritized to be schedulable for the interfering radio link with a constraint to reduce transmission power in the resource element, or blank transmission in the resource element, in a timer-based pattern.

26. The network entity of claim 14, wherein the network entity is a Central Control Unit (CCU) controlling a cluster of Access Nodes (ANs) and the plurality of radio links comprise links between the ANs and their associated terminal devices, links between the ANs, or both types of links.

* * * * *